United States Patent [19]

Kao

[11] Patent Number: 4,953,065
[45] Date of Patent: Aug. 28, 1990

[54] BRAKE LIGHT DEVICE MOUNTED ON TRUCK FENDER

[76] Inventor: Chung C. Kao, No 2-3, Tsou Tsuoh Luen, Shooei Yuan Li, Tansui, Taipei, Taiwan

[21] Appl. No.: 393,478
[22] Filed: Aug. 14, 1989
[51] Int. Cl.⁵ ............................................. B60Q 1/00
[52] U.S. Cl. ...................................... 362/83; 362/80; 362/307
[58] Field of Search ..................... 362/61, 80, 83, 240, 362/241, 245, 328, 307

[56] References Cited

U.S. PATENT DOCUMENTS

| | | | |
|---|---|---|---|
| 4,373,153 | 2/1983 | Sano et al. | 362/83 X |
| 4,532,578 | 7/1985 | Gaden et al. | 362/83 |
| 4,733,335 | 3/1988 | Serizawa et al. | 362/83 X |
| 4,831,503 | 5/1989 | DeSantis et al. | 362/240 X |

Primary Examiner—Ira S. Lazarus
Assistant Examiner—Peggy Neils
Attorney, Agent, or Firm—Asian Pacific Int'l Patent and Trademark Office

[57] ABSTRACT

A brake light device mounted on truck fender providing brake light warning signal day and night to promote driving security, including a base, a circuit board, a reflecting mirror, a set of wires and a light shade, wherein the base is formed with a central rectangular recess having a peripheral step portion, the circuit board being disposed on the step portion, and the reflecting mirror being disposed on the step portion, and the reflecting mirror being disposed on the circuit board while via screws, the light shade being associated with the base to envelope the circuit board and reflecting mirror, forming an assembly, which is mounted on the lower end of a fender by screws.

1 Claim, 3 Drawing Sheets 4,953,065

BRAKE LIGHT DEVICE MOUNTED ON TRUCK FENDER

BACKGROUND OF THE INVENTION

The present invention relates to a brake light device, and more particularly to a brake light device mounted on truck fender.

A truck has become an indispensable transportation tool nowadays. The traffic regulations have been regulated substantially in various countries. However, some shortcomings still exist therein. Since a truck generally has a height larger than a car's height, and consequently the brake light and turning lights thereof are located on a higher level, and thereby in case of bad weather or at night, many car accidents happen due to poor visibility.

SUMMARY OF THE INVENTION

It is a primary object of the present invention to provide a brake light device whereby when a vehicle is running, a. location light is lighted to inform the following drivers to keep a safe distance and running speed.

It is a further object of the present invention to provide a brake light device whereby when the brake is applied, a warning light is lighted to warn the following drivers.

The present invention includes a base, circuit board, reflecting mirror, light shade and fender. A location light and brake light are disposed on the circuit board, and a light-focusing plate is provided on an inner top surface of the light shade to focus the emitted light. A rectangular recess is formed on a middle portion of the base. A step portion is formed along the periphery of the recess whereby the circuit board is disposed on the step portion and the reflecting mirror is disposed on the circuit board. The light shade is associated with the base via screws to assemble the base, reflecting mirror and light shade. The assembly is placed at a proper position on the fender and secured thereto by screws. One end of a wire line is soldered on the reflecting mirror while the other end thereof is connected to the brake system. When the car is running, a location light is lighted and when the brake is applied, the brake light is further lighted for warning the following driver to keep an appropriate interval.

DETAILED DESCRIPTION OF THE PREFERRED EMBODIMENTS

Figure 1:
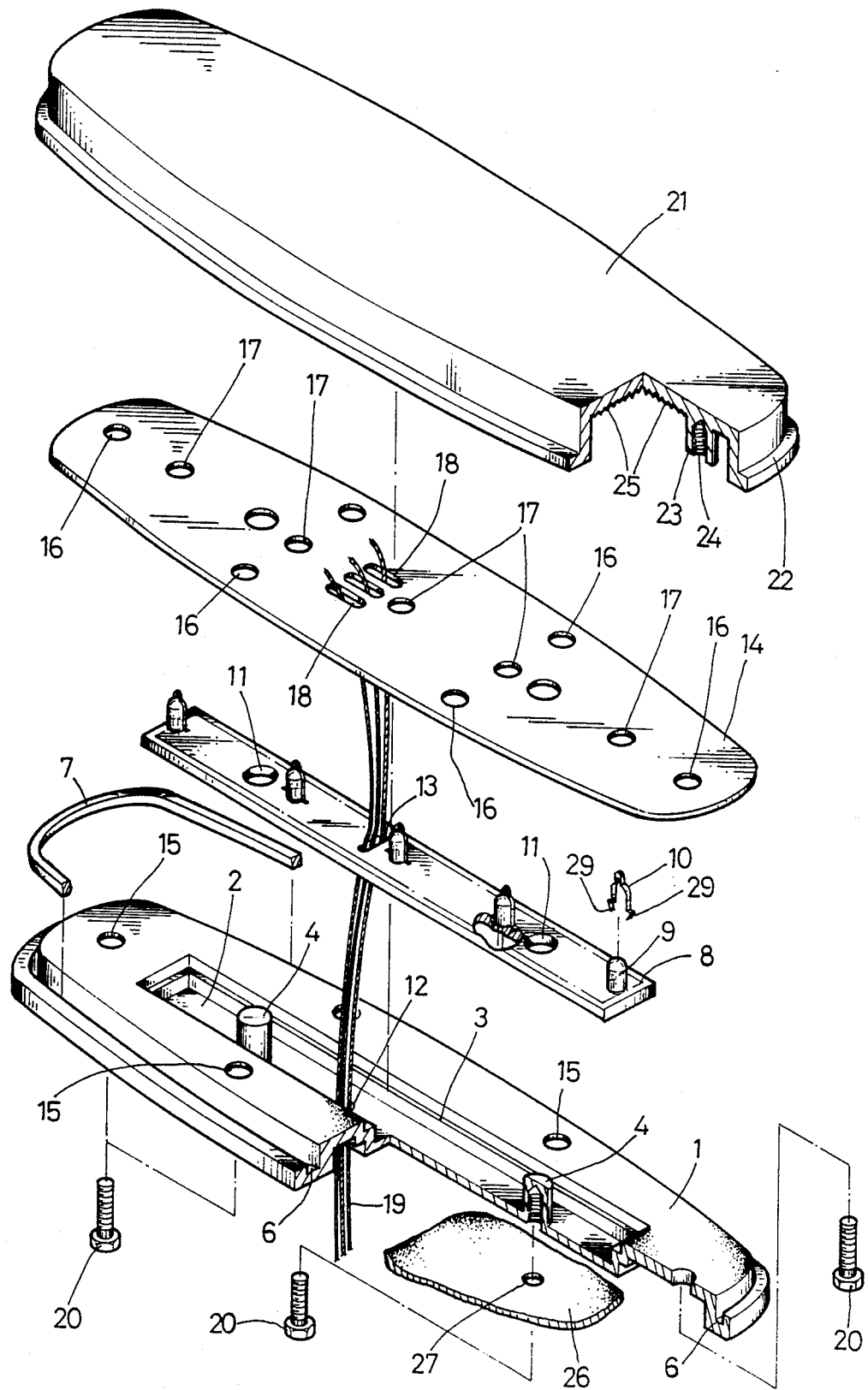
FIG. 1 is an exploded perspective view of the present invention.
Figure 2:
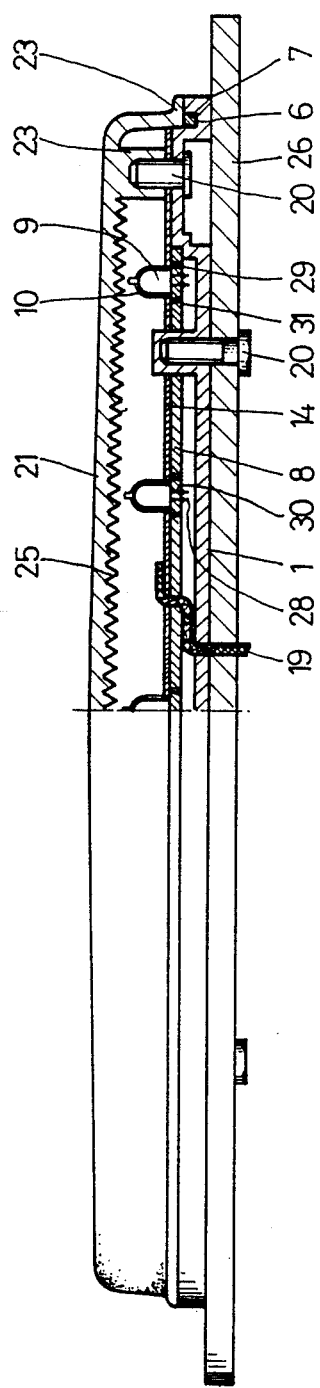
FIG. 2 is a partially sectional view of the present invention.
Figure 3:
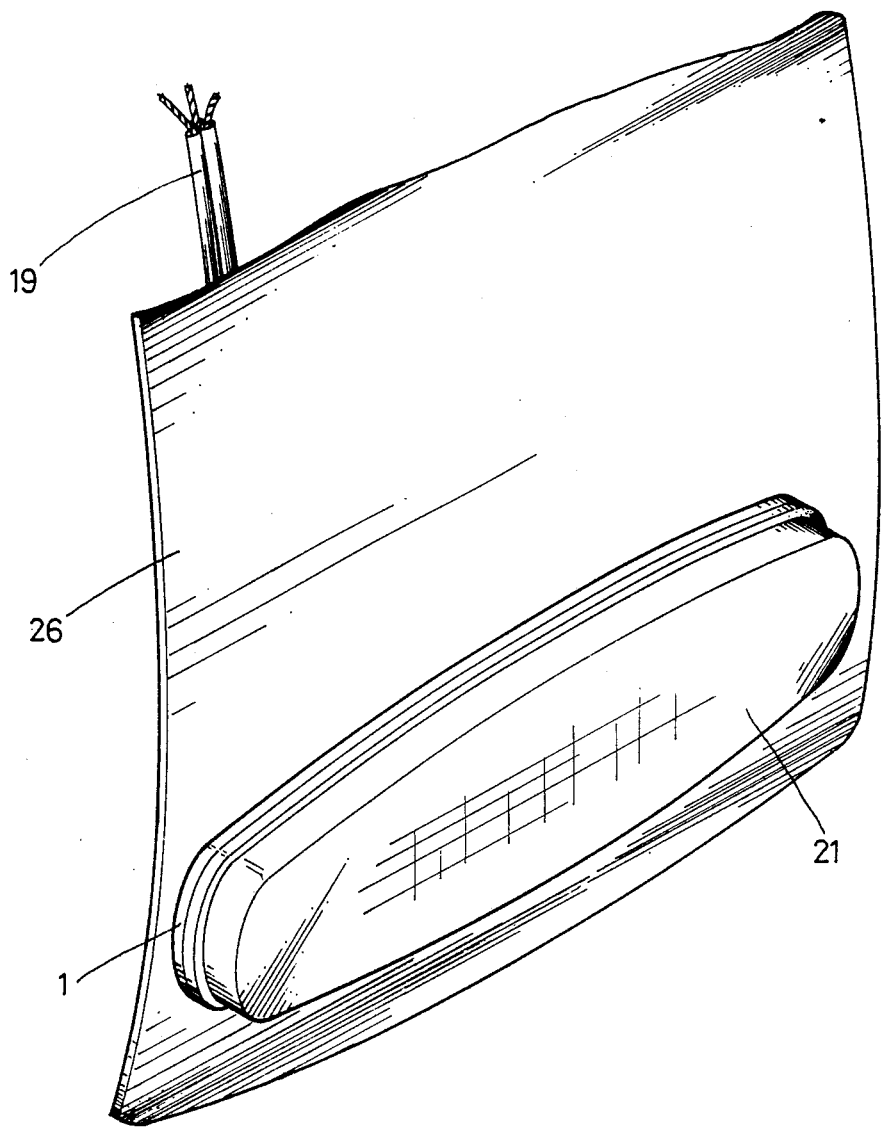
FIG. 3 is an assembled perspective view of the present invention.

Please refer to FIG. 1 showing an exploded perspective view of the present invention. A base 1 is formed with six thread holes 15 and a central rectangular recess 2. The recess 2 is formed with a step portion or ledge 3 along its periphery. Two projections or bosses 4 having female threads extend outwardly from the bottom of the recess 2. The base area surrounding recess 2 is raised away from the rear surface of the base, as shown in FIG. 2. Along the periphery of the base 1 is a peripheral groove 6 formed, into which a water-proof gasket 7 is disposed. A circuit board 8 is placed on the step portion 3. The circuit board 8 is provided with five socket holes 30 (FIG. 2) for bulbs 9, bulb clips 10 fixing the bulbs 9, a wire hole 13 and two through holes 11, permitting the projections 4 to go therethrough. The reflecting mirror or plate 14 is disposed on the circuit board 8 and base 1. The reflecting mirror 14 is formed with six thread holes 16 and five bulb holes 17 that align with the socket holes in board 8 for permitting bulbs 9 to go therethrough. As shown in FIG. 2, the peripheral area of reflector plate 14 is seated on the raised wall section of base 1. Three wires 19 going through holes 12,13 and respectively into three wire holes 18 of the reflecting mirror 14 are soldered to the reflecting mirror 14 at their first ends and connected to a brake system at their second ends. A hollow concave light shade or lens 21 is associated with the base 1 with its outer flange 22 closely contacting a water-proof gasket 7. This lens (shade) includes a main wall extending generally parallel to reflector plate 14 and a rim wall extending toward base 1; the rim wall terminates in a flange 22, The light shade 21 is provided with plural lozenge light-focusing blocks 25 formed on its inner top surface. Six projections 23 having female threads 24 are further located on the inner top surface of light shade 21, whereby by means of screws 20 going through holes 15,16 and screwed into female thread 24 of projections 23, the base 1, circuit board 8, reflecting mirror 14 and light shade 21 are assembled together. Further, by means of screws 20 going through holes 27 of a fender 26 and screwed into female threads 5 of projections 4, the base 1 is fixed to the fender 26 whereby when a vehicle is running, the left and right location lights are lighted and when the brake is applied, the intermediate three brake lights are further lighted for warning rearward drivers to keep an appropriate interval and safe running speed.

Please refer to FIG. 2 showing a partially sectional view of the present invention, wherein the bulbs 9 are inserted into socket holes 30 of the circuit board 8 and soldered thereon. Bulb clips 10 are further inserted into holes 31 of the circuit board 8. The bulb clip 10 is arch-shaped corresponding to the outer shape of the bulb 9 and has two inwardly slanted lower clipping ends 29 whereby when the bulb clip 10 is placed into holes 31, the clipping ends 29 thereof will clamp the bulb 9 via its elastic force and fix the bulb 9 in proper place to avoid dropping thereof due to rocking of a running car.

It will also be understood that while I have described a presently preferred embodiment of my invention in full detail, it will be obvious that my invention is not to be limited thereto or thereby, but only by that of the appended claims.

I claim:

1. A brake light indicator device adapted to be mounted on a truck fender, comprising:
a base (1) that includes a central wall section having a rear surface seatable against the fender, and a front surface defining a central recess (2); said base further including an annular raised wall section defining an annular rearwardly-facing recess surrounding the central recess; an annular ledge (3) extending along the periphery of said central recess; and at least two bosses (4) extending outwardly from the central wall section within the central recess; each boss having a blind threaded hole therein communicating with the rear surface of the central wall section, whereby the base can be detachably mounted on a truck fender by means of screws extendable through the fender into the blind holes;

a circuit board (8) having a rear edge surface seated on said ledge (3), a front surface facing outwardly away from the central surface, and a plural number of bulb-accommodating socket holes (3) extending therethrough at spaced points therealong;

a plural number of indicator bulbs seated in said socket holes, with light-emitting areas thereof located outwardly beyond the circuit board front surface; at least one of said bulbs being a vehicle location bulb, and at least one of said bulbs being a brake light bulb;

a reflector plate (14) having a central area thereof overlying the front surface of the circuit board, and a peripheral area thereof seated on the raised wall section of the base, whereby said reflector plate acts as a retainer for the circuit board;

and a hollow concave light-transmitting lens (21) overlying the reflector plate and indicator bulbs, said lens having an inner concave surface facing the reflector plate and an outer convex surface facing away from the reflector plate;

said lens including a main lens wall extending generally parallel to the reflector plate, and a rim wall extending rearwardly from said main walls to seat against the front surface of the base in surrounding relation to the raised wall section of the base; and a plural number of projections (23) extending from the inner surface of said plate; each projection having an internally threaded blind hole (24) therein, whereby screws can be extended through the raised section of the base and the reflector plate into said internally threaded holes to detachably clamp the lens to the reflector plate and base.

* * * * *